United States Patent [19]

Matsumoto et al.

[11] Patent Number: 4,830,995

[45] Date of Patent: May 16, 1989

[54] DIELECTRIC CERAMICS

[75] Inventors: Kazutoshi Matsumoto, Matsudo; Takehiro Hyuga, Ichikawa, both of Japan

[73] Assignee: Sumitomo Metal Mining Company Limited, Tokyo, Japan

[21] Appl. No.: 240,448

[22] Filed: Sep. 2, 1988

Related U.S. Application Data

[63] Continuation-in-part of Ser. No. 69,962, Jul. 6, 1987, abandoned.

[30] Foreign Application Priority Data

Jul. 9, 1986 [JP] Japan ................ 61-161538
Jul. 9, 1986 [JP] Japan ................ 61-161539
Jul. 31, 1986 [JP] Japan ................ 61-178823
Jul. 31, 1986 [JP] Japan ................ 61-178824
Feb. 18, 1987 [JP] Japan ................ 62-35306

[51] Int. Cl.$^4$ .................................. C04B 35/00
[52] U.S. Cl. ................................ 501/135; 501/134
[58] Field of Search ........................... 501/134, 135

[56] References Cited

U.S. PATENT DOCUMENTS

Re. 29,484 11/1977 Utsumi et al. .................. 501/138
3,997,457 12/1976 Takahashi et al. ............... 501/134
4,585,745 4/1986 Tunooka et al. ................ 501/135

FOREIGN PATENT DOCUMENTS 54-071400 6/1979 Japan .................. 501/134
61-040001 2/1986 Japan .................. 501/134
61-158612 7/1986 Japan .................. 501/134
2166431 5/1986 United Kingdom ........ 501/134

*Primary Examiner*—Mark L. Bell
*Assistant Examiner*—Anthony J. Green
*Attorney, Agent, or Firm*—Watson, Cole, Grindle & Watson

[57] ABSTRACT

A dielectric ceramic which has a composition represented by the following general formula (I) and having a substantially perovskite crystal structure:

$$(Ba_{1-x}Sr_x)(Mg_{1-y-w}Ni_yCo_w)_{1-u}(Ta_{1-z}Nb_z)_uO_p \quad (I)$$

wherein x, y, z, u, w and p satisfy one selected from the following conditions: $x=0$, $w=0$, $z=0$, $0.001 \leq y \leq 0.088$, $0.66 \leq u < 0.72$, and p represents a number with which the charges of the cations of Ba, Mg, Ni and Ta are neutralized, whereby the entire composition is electrically neutralized; $x=0$, $z=0$, $0.001 \leq y \leq 0.40$, $0.001 \leq w \leq 0.40$, $0.61 \leq u \leq 0.72$, $0.002 \leq y+w \leq 0.40$ and p represents a number with which the charges of the cations of Ba, Mg, Ni, Co and Ta are neutralized, whereby the entire composition is electrically neutralized; $x=0$, $w=0$, $0.04 \leq y \leq 0.90$, $0.10 \leq z < 0.96$, $0.61 \leq u \leq 0.72$, and p represents a number with which the charges of the cations of Ba, Mg, Ni, Nb and Ta are neutralized, whereby the entire composition is electrically neutralized; and $w=0$, $0 < x \leq 0.25$, $0 \leq y \leq 0.5$, $0 \leq z \leq 0.8$, $0.61 \leq u \leq 0.72$, and p represents a number with which the charges of the cations of Ba, Sr, Mg, Ni, Ta and Nb are neutralized, whereby the entire composition is electrically neutralized.

8 Claims, 1 Drawing Sheet

DIELECTRIC CERAMICS

This application is a continuation-in-part of application Ser. No. 069,962, filed July 6, 1987, now abandoned.

BACKGROUND OF THE INVENTION

1. Field of the Invention

The present invention relates to a dielectric ceramic and, more particularly, to a dielectric ceramic which has a high unloaded Q in a high-frequency range, thereby being suitable as a dielectric appliance for high frequencies.

2. Description of the Prior Art

A dielectric resonator and a dielectric substrate which are used for a signal circuit in a high-frequency range such as microwaves and milli waves are generally required to use a dielectric ceramic which has a high dielectric constant, a high unloaded Q, and a small absolute value of the temperature coefficient of the resonant frequency. For dielectric ceramic of this kind, $TiO_2$ materials have conventionally been used. For example, $BaO$-$TiO_2$ and $ZrO_2$-$SnO_2$-$TiO_2$ materials, and recently, $Ba(Zn,Ta)O_3$ and $Ba(Mg,Ta)O_3$ materials have been utilized. Dielectric ceramic made of these materials are characterized in that the unloaded Q is 3,000 to 7,000, the dielectric constant is 20 to 40, and the temperature coefficient of the resonant frequency is as small as approximately 0 ppm/°C. at a high frequency of about 10 GHz.

Communication apparatus have recently been adopting increasingly higher frequencies, and a dielectric ceramic having a higher unloaded Q is required in the SHF band used for satellite broadcasting, etc.

SUMMARY OF THE INVENTION

Accordingly, it is an object of the present invention to provide a dielectric ceramic made of a novel material in order to exhibit a higher unloaded Q.

To achieve this aim, the present invention provides a dielectric ceramic which has a composition represented by the following general formula (I) and having a substantially perovskite crystal structure:

$$(Ba_{1-x}Sr_x)(Mg_{1-y-w}Ni_yCo_w)_{1-u}(Ta_{1-z}Nb_z)_uO_p \quad (I)$$

wherein x, y, z, u, w and p satisfy one selected from the following conditions: $x=0$, $w=0$, $z=0$, $0.001 \leq y \leq 0.088$, $0.66 \leq u < 0.72$, and p represents a number with which the charges of the cations of Ba, Mg, Ni and Ta are neutralized, whereby the entire composition is electrically neutralized, i.e., $2.990 \leq p < 3.080$; $x=0$, $z=0$, $0.001 \leq y \leq 0.40$, $0.001 \leq w \leq 0.40$, $0.61 \leq u \leq 0.72$, $0.002 \leq y+w \leq 0.40$ and p represents a number with which the charges of the cations of Ba, Mg, Ni, Co and Ta are neutralized, whereby the entire composition is electrically neutralized, i.e., $2.915 \leq p \leq 3.136$; $x=0$, $w=0$, $0.04 \leq y \leq 0.90$, $0.10 \leq z < 0.96$, $0.61 \leq u \leq 0.72$, and p represents a number with which the charges of the cations of Ba, Mg, Ni, Nb and Ta are neutralized, whereby the entire composition is electrically neutralized, i.e., $2.915 \leq p \leq 3.080$; and $w=0$, $0 < x \leq 0.25$, $0 \leq y \leq 0.5$, $0 \leq z \leq 0.8$, $0.61 \leq u < 0.72$, and p represents a number with which the charges of the cations of Ba, Sr, Mg, Ni, Ta and Nb are neutralized, whereby the entire composition is electrically neutralized, i.e., $2.915 \leq p \leq 3.080$.

The above and other objects, features and advantages of the present invention will become clear from the following description of the preferred embodiments thereof, taken in conjunction with the accompanying drawings.

BRIEF DESCRIPTION OF THE FIGURE

The accompanying FIGURE is an X-ray diffraction chart of an emodiment of a dielectric ceramic according to the present invention.

DESCRIPTION OF THE PREFERRED EMBODIMENTS

Figure 1:
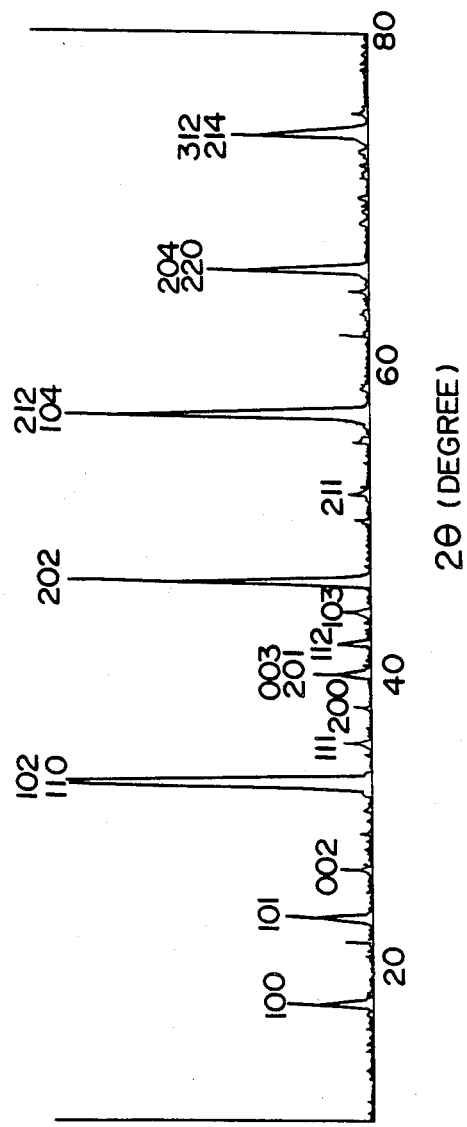

In the above-described general formula (I), x, y, z, u and w, which represent the composition ratio of each cation, are important in order to enhance the unloaded Q in a high-frequency range, which is one of the objects of the present invention, and the respective ranges of x, y, z, u and w are so determined so as to achieve this object.

If $x=0$, $w=0$, and $z=0$, the general formula (I) becomes $Ba\{(Mg_{1-y}Ni_y)_{1-u}Ta_u\}O_p$. The ranges of y and u are restricted to the following ranges: $0.001 \leq y \leq 0.088$ and $0.66 \leq u < 0.72$. If y exceeds 0.088, the unloaded Q is lowered, while if it is less than 0.001, the raw material is difficult to sinter. On the other hand, if u is less than 0.66, the raw material is difficult to sinter, while if it is 0.72 or more, the unloaded Q is unfavorably lowered and the temperature coefficient of the resonant frequency rapidly increases in the positive direction. It is preferable that $0.66 \leq u \leq 0.68$.

If $x=0$ and $z=0$, the general formula (I) becomes $Ba\{(Mg_{1-y-w}Ni_yCo_w)_{1-u}Ta_u\}O_p$. The ranges of y and w are restricted to the following ranges: $0.001 \leq y \leq 0.40$ and $0.001 \leq w \leq 0.40$. If y or w is less than 0.001, the raw material is difficult to sinter or the unloaded Q is lowered. If y or w exceeds 0.40, the unloaded Q is lowered. The range of y+w is $0.002 \leq y+w \leq 0.40$, preferably $0.002 \leq y+w \leq 0.35$. If y+w is less than 0.002, the raw material is difficult to sinter, while if it exceeds 0.40, the unloaded Q is unfavorably lowered and the temperature coefficient of the resonant frequency suddenly increases in the negative direction. When y+w is in the range of 0.002 to 0.40, it is possible to adjust the temperature coefficient of the resonant frequency to a given value. Specifically, if y+w is in the range of 0.002 to 0.15, it is possible to adjust the temperature coefficient to 0 to 10 ppm/°C., and if y+w is in the range of 0.15 to 0.40, it is possible to adjust the temperature coefficient to a given value ranging from 0 to −13 ppm/°C. The range of u is $0.61 \leq u \leq 0.72$, preferably $0.66 \leq u \leq 0.68$. If u is less than 0.61, the raw material is difficult to sinter, while if it exceeds 0.72, the unloaded Q is unfavorably lowered and the temperature coefficient of the resonant frequency suddenly increases in the positive direction.

In the case of $x=0$ and $w=0$, the general formula (I) becomes $Ba(Mg_{1-y}Ni_y)_{1-u}(Ta_{1-z}Nb_z)_uO_p$. The ranges of y and u are restricted to the following ranges: $0.04 \leq y \leq 0.90$ and $0.61 \leq u \leq 0.72$, preferably $0.66 \leq u \leq 0.68$. If y exceeds 0.90, the unloaded Q is lowered, while if y is less than 0.04 or u exceeds 0.72, the unloaded Q is unfavorably lowered and the temperature coefficient of the resonant frequency increases too much in the positive direction. If u is less than 0.61, the raw material is difficult to sinter.

In the case of $w=0$, the general formula (I) becomes $(Ba_{1-x}Sr_x)(Mg_{1-y}Ni_y)_{1-u}(Ta_{1-z}Nb_z)_uO_p$. The ranges of x, y, z and u are restricted to the following ranges:

$0 < x \leq 0.25$, $0 \leq y \leq 0.5$, $0 \leq z \leq 0.8$, and $0.61 \leq u \leq 0.72$. If x is 0, namely, no Sr is contained, the raw material is difficult to sinter, while if x exceeds 0.25, the temperature coefficient of the resonant frequency unfavorably rapidly increases in the positive direction. The value of y may be zero, in other words, no Ni may be contained in the raw material, while if y exceeds 0.5, the unloaded Q is lowered. The value of z may be zero, in other words, no Nb may be contained in the raw material, while if z exceeds 0.8, the unloaded Q is unfavorably lowered and the temperature coefficient of the resonant frequency increases too much in the positive direction.

The symbol p may be any number with which the charges of the cations of the elements constituting the compositions represented by the general formula (I) are neutralized, whereby the entire composition is electrically neutralized.

A dielectric ceramic according to the present invention has a substantially perovskite crystal structure. That is, a phase of a perovskite crystal structure is observed in the dielectric ceramic and hardly any other phase is observed by X-ray diffraction.

A dielectric ceramic according to the present invention is produced not by a specific method but an ordinary method. For example, powders of barium carbonate, strontium carbonate, magnesium oxide, nickel oxide, tantalum oxide and niobium oxide are weighed as materials for Ba, Sr, Mg, Ni, Ta and Nb components, respectively, so that a ceramic of the desired composition may be obtained. These powders are thoroughly mixed. The mixture is calcined, pulverized and press molded. The molded body obtained is sintered at a temperature of about 1,500° to 1,650° C. to obtain a dielectric ceramic of the present invention.

The present invention will be explained in detail with reference to the following examples and comparative examples.

EXAMPLE 1

As a raw material, powders of barium carbonate, magnesium oxide, nickel oxide and tantalum oxide, each having a purity of 99.9 wt%, were prepared. These powders were weighed so as to prepare 8 kinds of samples shown in Table 1 (the samples marked with * are comparative examples, and the others are embodiments of the present invention) which have the respective values shown in Table 1 as the values of y and u in the general formula (I): $Ba\{(Mg_{1-y}Ni_y)_{1-u}Ta_u\}O_p$. The value of p was 3.0. The powders were charged into a pot of a ball mill together with pure water and wet blended for 16 hours. The mixture was taken out of the pot and dried at 150° C. for 5 hours. Thereafter, the mixture was calcined at 1,000° C. for 2 hours in the air. After calcination, it was pulverized and screened through a sieve of 42 mesh. The thus-obtained powder was molded into a disk 10 mm in diameter and 5 mm in thickness at a pressure of 500 kg/cm² by using a die, and was thereafter pressed at a pressure of 2,000 kg/cm² by a rubber press to obtain a formed body. The formed body was sintered at 1,650° C. for 4 hours in a stream of oxygen, thereby obtaining ceramic.

The dielectric constant (εr) and the unloaded Q (Qu) of the thus-obtained ceramic were measured at a frequency of about 10 GHz by the dielectric resonator method. The resonance frequencies in the temperature range of −10° to 80° C. were measured so as to calculate the temperature coefficient (τf) of the resonant frequency at 20° C. The results obtained are shown in Table 1.

EXAMPLE 2

As a raw material, powders of barium carbonate, magnesium oxide, nickel oxide, cobalt oxide and tantalum oxide, each having the purity of 99.9 wt%, were prepared. These powders were weighed so as to prepare 24 kinds of samples shown in Table 2 (the samples marked with * are comparative examples, and the others are embodiments of the present invention) which have the respective values shown in Table 2 as the values of y, w and u in the general formula (I): $Ba\{(Mg_{1-y-w}Ni_yCo_w)_{1-u}Ta_u\}O_p$. The p value ranged from 3.00 to 3.07. A ceramics was obtained in the same process and under the same conditions as in Example 1.

The dielectric constant (εr), the unloaded Q (Qu) and the temperature coefficient (τf) of the resonant frequency were measured in the same was as in Example 1, the results being shown in Table 2.

TABLE 1

| Sample No.[1] | y and u in the general formula (I) | | εr | Qu | τf (ppm/°C.) |
|---|---|---|---|---|---|
| | y | u | | | |
| 1 | 0.005 | 0.667 | 24.9 | 16,300 | 6.1 |
| 2 | 0.010 | 0.667 | 25.0 | 17,700 | 5.8 |
| 3 | 0.030 | 0.667 | 24.8 | 17,200 | 5.2 |
| 4 | 0.050 | 0.667 | 24.7 | 14,400 | 4.6 |
| 5 | 0.070 | 0.667 | 24.7 | 12,100 | 4.0 |
| 6 | 0.088 | 0.667 | 24.6 | 10,000 | 3.2 |
| 7*[2] | 0.000 | 0.667 | — | — | — |
| 8* | 0.090 | 0.667 | 24.6 | 9,100 | 3.0 |

(note)
[1]The samples marked with * represent comparative examples, the others being embodiments of the present invention.
[2]Sample No. 7 was not sintered, thereby making it impossible to measure the respective characteristics.

TABLE 2

| Sample No.[1] | y + w, y, w and u in the general formula (I) | | | | εr | Qu | τf (ppm/°C.) |
|---|---|---|---|---|---|---|---|
| | y + w | y | w | u | | | |
| 9*[2] | 0.001 | 0 | 0.001 | 0.667 | — | — | — |
| 10 | 0.002 | 0.001 | 0.001 | 0.667 | 24.0 | 10,100 | 4 |
| 11 | 0.005 | 0.0025 | 0.0025 | 0.667 | 24.0 | 11,300 | 5 |
| 12*[2] | 0.005 | 0 | 0.005 | 0.667 | — | — | — |
| 13 | 0.010 | 0.005 | 0.005 | 0.667 | 24.6 | 13,400 | 6 |
| 14 | 0.030 | 0.015 | 0.015 | 0.667 | 24.6 | 16,700 | 8 |
| 15 | 0.060 | 0.030 | 0.030 | 0.667 | 24.9 | 10,900 | 6 |
| 16 | 0.100 | 0.050 | 0.050 | 0.667 | 24.7 | 15,500 | 3 |
| 17 | 0.150 | 0.075 | 0.075 | 0.667 | 24.6 | 14,600 | 0 |
| 18* | 0.200 | 0.200 | 0 | 0.667 | 24.7 | 7,000 | 2 |
| 19 | 0.200 | 0.100 | 0.100 | 0.667 | 24.7 | 13,400 | −1 |
| 20* | 0.200 | 0 | 0.200 | 0.667 | 24.7 | 6,800 | 2 |
| 21 | 0.250 | 0.180 | 0.070 | 0.667 | 24.9 | 12,800 | −1 |
| 22 | 0.250 | 0.070 | 0.180 | 0.667 | 24.8 | 12,500 | −1 |
| 23 | 0.300 | 0.150 | 0.150 | 0.667 | 25.0 | 12,400 | −3 |
| 24 | 0.350 | 0.300 | 0.050 | 0.667 | 25.0 | 10,800 | −5 |
| 25 | 0.350 | 0.050 | 0.300 | 0.667 | 24.9 | 9,300 | −6 |
| 26 | 0.395 | 0.390 | 0.005 | 0.667 | 25.2 | 8,700 | −7 |
| 27 | 0.395 | 0.005 | 0.390 | 0.667 | 25.1 | 8,200 | −9 |
| 28 | 0.400 | 0.010 | 0.390 | 0.667 | 25.2 | 7,700 | −10 |
| 29 | 0.400 | 0.390 | 0.010 | 0.667 | 25.2 | 7,600 | −9 |
| 30 | 0.400 | 0.200 | 0.200 | 0.667 | 25.3 | 8,000 | −13 |
| 31* | 0.420 | 0.310 | 0.110 | 0.667 | 25.3 | 6,900 | −17 |
| 32* | 0.420 | 0.110 | 0.310 | 0.667 | 25.2 | 5,800 | −16 |

(note)
[1]The samples marked with * represent comparative examples, the others being embodiments of the present invention.
[2]Samples No. 9 and 12 were not sintered, thereby making it impossible to measure the respective characteristics.

It is obvious from Tables 1 and 2 that the dielectric ceramic of sample Nos. 1 to 6, 10, 11, 13 to 17, 19 and 21 to 30, which are embodiments of the present invention, have efficient characteristics in the dielectric constant, unloaded Q and the temperature coefficient of the resonant frequency, and that, in particular, the unloaded Q have large values exceeding 7,000, sometimes exceeding 10,000 depending upon the composition.

On the other hand, the ceramic of sample Nos. 8, 18, 20, 31 and 32, which have the composition out of the range of the present invention, have small unloaded Q and the temperature dependency of the resonant frequency is not always good.

When the ceramic of the above-described sample Nos., namely, the embodiments of the present invention were pulverized and the thus-obtained powders were subjected to X-ray diffraction, phases of the perovskite crystal structure were observed and completely no or hardly any other phase was observed. FIG. 1 is an X-ray diffraction chart of the ceramic of the sample No. 19. The indexed diffraction lines derive from a hexagonal perovskite structure, and hardly any other diffraction line is observed.

EXAMPLE 3

As a raw material, powders of barium carbonate, magnesium oxide, nickel oxide, tantalum oxide and niobium oxide, each having the purity of 99.9 wt%, were prepared. These powders were weighed so as to prepare 9 kinds of samples shown in Table 3 (the samples marked with * are comparative examples, and the others are embodiments of the present invention) which have the respective values shown in Table 3 as the values of y and u in the general formula (I): $Ba(Mg_{1-y}Ni_y)_{1-u}(Ta_{1-z}Nb_z)_uO_p$. The value of p was 3.0. A ceramic was obtained in the same process and under the same conditions as in Example 1.

The dielectric constant ($\epsilon r$), the unloaded Q (Qu) and the temperature coefficient ($\tau f$) of the resonant frequency were measured in the same was as in Example 1, the results being shown in Table 3.

It is obvious from Table 3 that the dielectric ceramic of sample Nos. 35 to 40, which are embodiments of the present invention, have the unloaded Qs larger than 7,000.

TABLE 3

| Sample No. | z,y and u in the general formula (I) | | | $\epsilon r$ | Qu | $\tau f$ (ppm/°C.) |
| --- | --- | --- | --- | --- | --- | --- |
| | z | y | u | | | |
| 33* | 1.00 | 0.00 | 0.67 | 29.7 | 5,300 | 35 |
| 34* | 0.98 | 0.02 | 0.67 | 31.8 | 6,500 | 30 |
| 35 | 0.96 | 0.04 | 0.67 | 32.1 | 7,100 | 24 |
| 36 | 0.90 | 0.10 | 0.67 | 31.0 | 7,800 | 18 |
| 37 | 0.70 | 0.30 | 0.67 | 30.3 | 9,700 | 3 |
| 38 | 0.50 | 0.50 | 0.67 | 28.4 | 9,300 | −7 |
| 39 | 0.30 | 0.70 | 0.67 | 26.6 | 9,000 | −13 |
| 40 | 0.10 | 0.90 | 0.67 | 25.0 | 7,400 | −18 |
| 41* | 0.07 | 0.93 | 0.67 | 24.2 | 6,400 | −20 |

(note)
The samples marked with * represent comparative examples, the others being embodiments of the present invention.

EXAMPLE 4

As a raw material, powders of barium carbonate, strontium carbonate, magnesium oxide, nickel oxide, tantalum oxide and niobium oxide, each having the purity of 99.9 wt%, were prepared. These powders were weighed so as to prepare 21 kinds of samples shown in Table 4 (the samples marked with * are comparative examples, and the others are embodiments of the present invention) which have the respective values shown in Table 4 as the values of x, y, z and u in the general formula (I): $(Ba_{1-x}Sr_x)(Mg_{1-y}Ni_y)_{1-u}(Ta_{1-z}Nb_z)_uO_p$. The value of p was 3.0. A ceramic was obtained in the same process and under the same conditions as in Example 1.

The dielectric constant ($\epsilon r$), the unloaded Q (Qu) and the temperature coefficient ($\tau f$) of the resonant frequency were measured in the same way as in Example 1, the results being shown in Table 4.

It is obvious from Table 4 that the dielectric ceramic of sample Nos. 42 to 54, which are embodiments of the present invention, have the unloaded Q larger than 7,000.

TABLE 4

| Sample No. | x, y, and z in the general formula (I) (u = 0.67) | | | $\epsilon r$ | Qu | $\tau f$ (ppm/°C.) |
| --- | --- | --- | --- | --- | --- | --- |
| | x | y | z | | | |
| 42 | 0.01 | 0.0 | 0.0 | 25 | 1,5000 | 4 |
| 43 | 0.01 | 0.0 | 0.8 | 30 | 10,000 | 27 |
| 44 | 0.01 | 0.5 | 0.0 | 24 | 13,200 | −6 |
| 45 | 0.01 | 0.5 | 0.8 | 30 | 9,200 | 12 |
| 46 | 0.1 | 0.1 | 0.3 | 26 | 14,000 | 27 |
| 47 | 0.1 | 0.2 | 0.7 | 30 | 10,000 | 44 |
| 48 | 0.1 | 0.3 | 0.4 | 27 | 11,000 | 21 |
| 49 | 0.2 | 0.1 | 0.5 | 28 | 10,000 | 40 |
| 50 | 0.2 | 0.4 | 0.6 | 29 | 8,000 | 32 |
| 51 | 0.25 | 0.0 | 0.0 | 24 | 14,000 | 47 |
| 52 | 0.25 | 0.0 | 0.8 | 30 | 7,400 | 44 |
| 53 | 0.25 | 0.5 | 0.0 | 25 | 8,000 | 39 |
| 54 | 0.25 | 0.5 | 0.8 | 30 | 7,900 | 48 |
| 55* | 0.0 | 0.4 | 0.0 | NOT SINTERED | | |
| 56* | 0.0 | 0.4 | 0.5 | NOT SINTERED | | |
| 57* | 0.1 | 0.1 | 0.85 | 31 | 6,900 | 51 |
| 58* | 0.1 | 0.55 | 0.6 | 28 | 5,800 | 42 |
| 59* | 0.2 | 0.4 | 0.9 | 31 | 6,400 | 60 |
| 60* | 0.2 | 0.6 | 0.2 | 25 | 5,900 | 41 |
| 61* | 0.3 | 0.1 | 0.1 | 24 | 6,000 | 59 |
| 62* | 0.35 | 0.4 | 0.7 | 29 | 4,500 | 62 |

(note)
The samples marked with * represent comparative examples, the others being embodiments of the present invention.

The dielectric ceramic of the present invention has efficient characteristics in the dielectric constant, the unloaded Q and the temperature coefficient of the resonant frequency in a high-frequency range in the vicinity of 10 GHz. Especially, since the unloaded Q is a large value exceeding 7,000, and can be more than 10,000 in the case where the composition is $Ba\{(Mg_{1-y-w}Ni_yCo_w)_{1-u}Ta_u\}O_p$ or $Ba\{(Mg_{1-y}Ni_y)_{1-u}Ta_u\}O_p$, it can meet the recent demand for the use of higher frequencies.

In addition, it has a small absolute value of the temperature coefficient of the resonant frequency and it is possible to freely control the value in accordance with purpose. It also has a high value in the dielectric constant. Thus, the dielectric ceramic of the present invention is very useful as a dielectric resonator and a dielectric substrate for high frequencies.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A dielectric ceramic consisting essentially of a composition represented by the general formula:

$$Ba\{(Mg_{1-y}Ni_y)_{1-u}Ta_u\}O_p$$

wherein $0.001 \leq y \leq 0.088$, $0.66 \leq u < 0.72$, and $2.990 \leq p < 3.080$.

2. A ceramic according to claim 1, wherein $0.66 \leq u \leq 0.68$.

3. A dielectric ceramic consisting essentially of a composition represented by the general formula:

$$Ba\{(Mg_{1-y-w}Ni_yCo_w)_{1-u}Ta_u\}O_p$$

wherein $0.001 \leq y \leq 0.40$, $0.001 \leq w \leq 0.40$, $0.61 \leq u \leq 0.72$, $0.002 \leq y+w \leq 0.40$, and $2.915 \leq p \leq 3.136$.

4. A ceramic according to claim 3, wherein $0.002 \leq y+w \leq 0.35$.

5. A ceramic according to claim 3, wherein $0.66 \leq u \leq 0.68$.

6. A dielectric ceramic consisting essentially of a composition represented by the general formula:

$$Ba(Mg_{1-y}Ni_y)_{1-u}(Ta_{1-z}Nb_z)_uO_p$$

wherein $0.004 \leq y \leq 0.90$, $0.10 \leq z \leq 0.96$, $0.61 \leq u \leq 0.72$, and $2.915 \leq p \leq 3.080$.

7. A ceramic according to claim 6, wherein $0.66 \leq u \leq 0.68$.

8. A dielectric ceramic consisting essentially of a composition represented by the general formula:

$$(Ba_{1-x}Sr_x)(Mg_{1-y}Ni_y)_{1-u}(Ta_{1-z}Nb_z)_uO_p$$

wherein $0 < x \leq 0.25$, $0 \leq y \leq 0.5$, $0 \leq z \leq 0.8$, $0.61 \leq u \leq 0.72$, and $2.915 \leq p \leq 3.080$.

* * * * *